United States Patent [19]

Flater

[11] Patent Number: 5,464,241
[45] Date of Patent: Nov. 7, 1995

[54] PLURAL HEIGHT POWERED FIFTH WHEEL HITCH

[75] Inventor: James H. Flater, Zeeland, Mich.

[73] Assignee: Holland Hitch Company, Holland, Mich.

[21] Appl. No.: 280,158

[22] Filed: Jul. 25, 1994

[51] Int. Cl.$^6$ ................................ B62D 53/08
[52] U.S. Cl. ................ 280/425.1; 280/434; 280/435
[58] Field of Search ............................ 280/438.1, 441.1, 280/425.1, 433, 434, 435, 436

[56] References Cited

U.S. PATENT DOCUMENTS

| | | | |
|---|---|---|---|
| 2,045,647 | 6/1936 | Helms | 280/425.1 |
| 2,928,684 | 3/1960 | Geiger | 280/425.1 |
| 3,066,956 | 12/1962 | Colorigh | 280/438.1 |
| 3,117,804 | 1/1964 | Bistrom | 280/438.1 |
| 3,139,289 | 6/1964 | Richler | 280/425.1 |
| 3,253,840 | 5/1966 | Granning | 280/425.1 |
| 3,287,038 | 11/1966 | Candlin, Jr. | 280/422 |
| 3,337,170 | 8/1967 | Remy | 410/61 |
| 3,380,758 | 4/1968 | Granning | 280/425.1 |
| 3,552,774 | 1/1971 | Gottler | 280/425.1 |
| 3,717,273 | 2/1973 | Berends | 280/425.1 |
| 3,810,663 | 5/1974 | Berends | 280/425.1 |
| 4,475,740 | 10/1984 | Strick | 280/403 |
| 4,671,527 | 6/1987 | Wilson | 280/441.1 |

FOREIGN PATENT DOCUMENTS

| | | |
|---|---|---|
| 1755502 | 8/1971 | Germany . |
| 1755798 | 12/1971 | Germany . |
| 2542328 | 3/1977 | Germany . |
| 3004218 | 8/1981 | Germany . |
| 549826 | 1/1979 | Japan . |
| 9826 | 1/1979 | Japan ................................ 280/425.1 |
| 773459 | 4/1957 | United Kingdom ............... 280/425.1 |

*Primary Examiner*—Mitchell J. Hill
*Attorney, Agent, or Firm*—Price, Heneveld, Cooper, DeWitt & Litton

[57] ABSTRACT

A powered, adjustable height, fifth wheel hitch comprising a support plate having a front end portion and a rear end portion, a fifth wheel plate above the support plate having a front portion and a bifurcated rear portion, coaxial transverse trunnion pins supporting the fifth wheel plate on the support plate, a pair of spaced rear mounts on the support plate rear end portion, torque frame linkage between the rear mounts and the trunnion pins, a pair of spaced forward slides on the support plate front end portion, a pair of spaced forward links between the torque frame linkage and the slides, lock pin receiving openings in the forward links, interconnected lock pins shiftable simultaneously between lock position in the openings and unlock position out of the openings, a pair of laterally spaced cam follower rollers on respective torque frame linkage, a pair of laterally spaced, slidably movable, vertically tapered wedging cams on the support plate, engageable beneath respective ones of the cam followers, a pair of fluid actuators attached to the support plate and connected to the wedging cams to shift the wedging cams toward and away from the cam followers, and thereby shift the cam followers vertically up and down respectively, the wedging cams each having first and second internested wedges, one above the other, and a slide connection therebetween so that first the lower wedges engage the cam follower rollers to start the lifting function of the fifth wheel, and then the upper wedges shift and engage the cam follower rollers to shift the fifth wheel plate to its upper position.

7 Claims, 4 Drawing Sheets

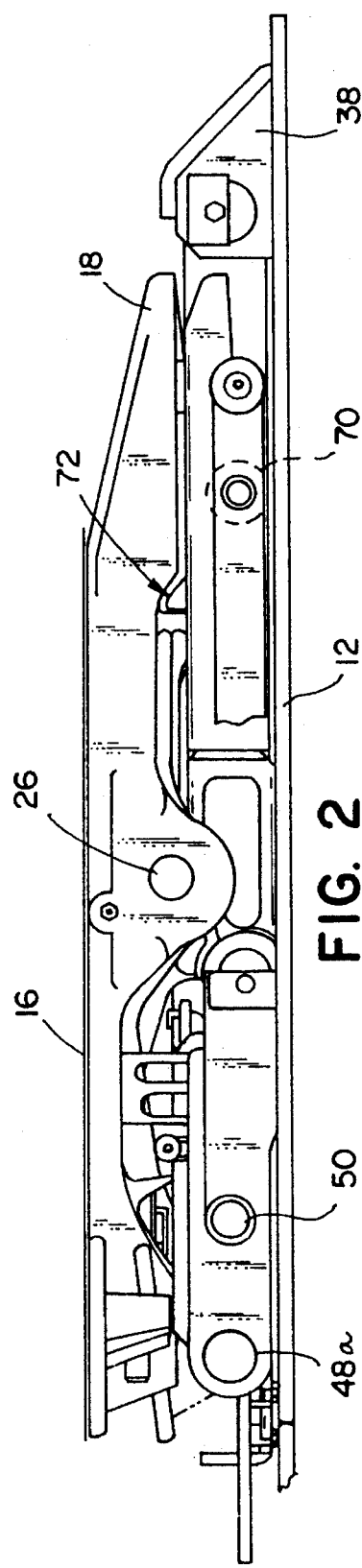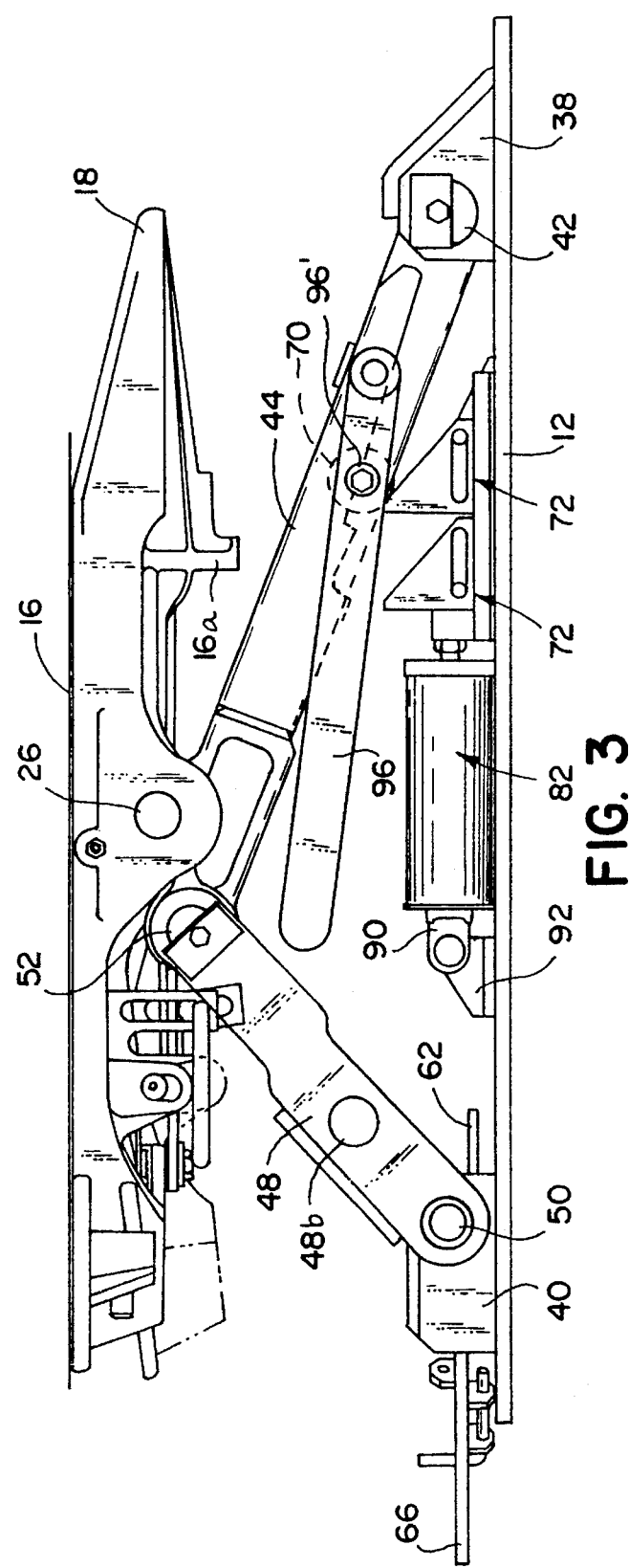

5,464,241

PLURAL HEIGHT POWERED FIFTH WHEEL HITCH

BACKGROUND OF THE INVENTION

This invention relates to fifth wheel hitches, and particularly to power elevated, variable height fifth wheel hitches.

The concept of a manually or power operated, variable height fifth wheel hitch is known, as shown for example by U.S. Pat. Nos. 4,671,527; 3,552,774; 3,139,289; 2,928,684; 3,066,956; 3,117,804; 3,287,038; 3,337,170; 4,475,740; 3,253,840; 3,380,758; 3,717,273; 3,810,663 and 4,671,527. Typically the actuators used require significant modification or total redesign of the fifth wheel hitch, to accommodate the lifting structure. The typical conventional hitch, for example, has downwardly projecting reinforcing ribs extending beneath the fifth wheel hitch plate, for strength. This conventional structure provides only a very small space to conceivably insert any actuators for operating a powered, variable height fifth wheel hitch through a vertical range of several inches.

The manual apparatus of U.S. Pat. No. 4,671,527 was developed because of the cost and complexity of previously known power elevated, variable height fifth wheel hitches. However, there are several situations where the physical character of the driver and/or the weight and size of the hitch render manual elevation of the hitch extremely difficult or even impossible.

SUMMARY OF THE INVENTION

One object of this invention is to provide a power elevated fifth wheel hitch which enables power lift devices, e.g., fluid cylinders, to be mounted in the small space beneath the conventional fifth wheel hitch plate, yet without significantly altering or redesigning the fifth wheel hitch.

Another object of the invention is to provide a power actuated fifth wheel hitch utilizing only the small space beneath the standard fifth wheel hitch plate, the hitch being elevated by power actuators, preferably fluid cylinder actuators, which advance plural component wedging cams into elevating engagement with cam follower rollers. The wedging cams have internesting first and second wedges which sequentially engage the rollers, the wedges being slidably movable with respect to each other so that the actuator advances a first wedge of a small acute angle into engagement with the roller, to initially partially elevate the fifth wheel, and then advances a second wedge of a larger acute angle, through a sliding connection with the first wedge, to further elevate the fifth wheel.

Linkage between the fifth wheel and the underlying support includes forward links and rearward torque frame. The forward links are attached to mounts which are fixed on the front end of the support. The rearward torque frame is attached to mounts which are fixed on the rear end of the support. The lower first wedge has a much smaller acute angle of rise, while the upper second wedge has a greater acute angle of rise. Preferably the lower wedge has surfaces of two different acute angles, the first being the smaller acute angle noted above and the second being an angle corresponding to the greater acute angle of the second wedge, to facilitate transfer of the roller from the first wedge to the second wedge. In the embodiment depicted, a roll pin and slot connection between the wedges governs movement between the wedges.

When the fifth wheel hitch is elevated or lowered, a pair of interference elements, shown in the form of transverse locking pins, are shifted laterally into receiving openings to lock the slidable mounts in place on the underlying support.

These and several other objects, advantages and features of the invention will become apparent upon studying the following specification in conjunction with the drawings.

BRIEF DESCRIPTION OF THE DRAWINGS

FIG. 2 is a side elevational view of the hitch assembly in FIG. 1, in its lowered condition;

FIG. 3 is a side elevational view of the hitch in FIGS. 1 and 2, in an elevated position;

DESCRIPTION OF THE PREFERRED EMBODIMENT

Figure 1:
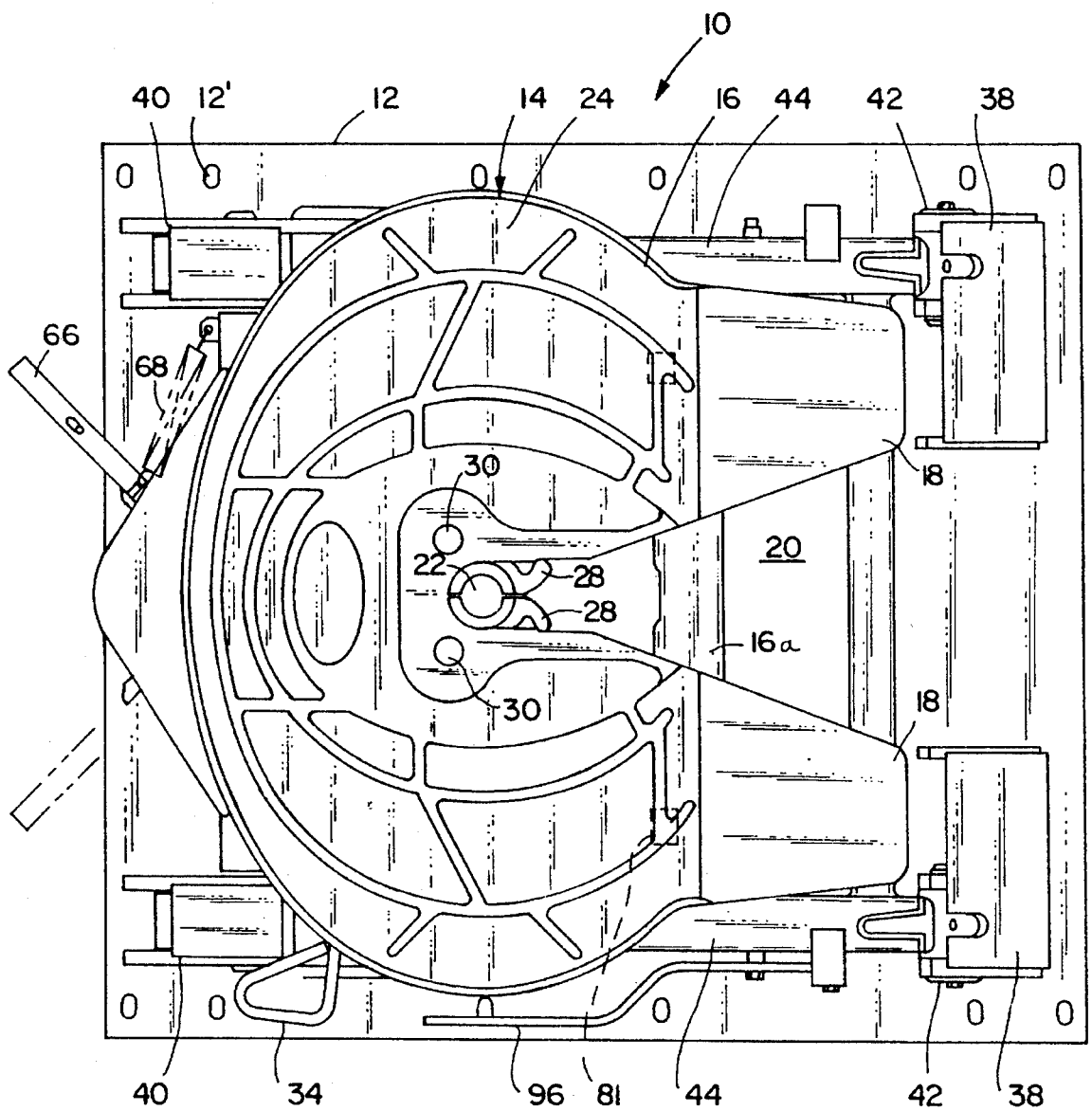
FIG. 1 is a plan view of a hitch assembly of this invention.

Referring now specifically to the drawings, the fifth wheel hitch assembly 10 there depicted includes a support 12 shown as a rectangular plate having suitable openings 12' for mounting it to the chassis of a truck tractor, and supporting a fifth wheel hitch 14 thereabove. Fifth wheel hitch 14 includes a fifth wheel plate 16 of typical bifurcated construction, having rearward projections 18 which straddle a rearwardly oriented kingpin-receiving mouth 20 therebetween. This mouth has engagement surfaces on opposite sides thereof which converge forwardly to a throat 22 centrally of the fifth wheel plate and hitch. The throat is blind, having a semicylindrical configuration on its blind forward end to receive a conventional kingpin. A manual control handle 34 or its equivalent may be used to open jaws 28 for disconnection, the jaws closing automatically around an entering kingpin in conventional fashion for connection.

The terms forward and rearward when used herein have reference to the forward and rearward portions of the hitch when mounted on a truck tractor.

The hitch has a pair of transverse, axially aligned trunnion cavities 24 on opposite lateral sides thereof, to receive a pair of conventional trunnion pin assemblies 26 (FIG. 3) to mount the fifth wheel on the support and thus on the vehicle. A pair of jaws 28 are pivotally movable about pins 30 in conventional fashion to lock onto a kingpin in the fifth wheel hitch throat. The fifth wheel is free to rock forwardly and backwardly on the trunnion pins to enable the truck tractor and trailer to accommodate uneven terrain.

Figure 4:
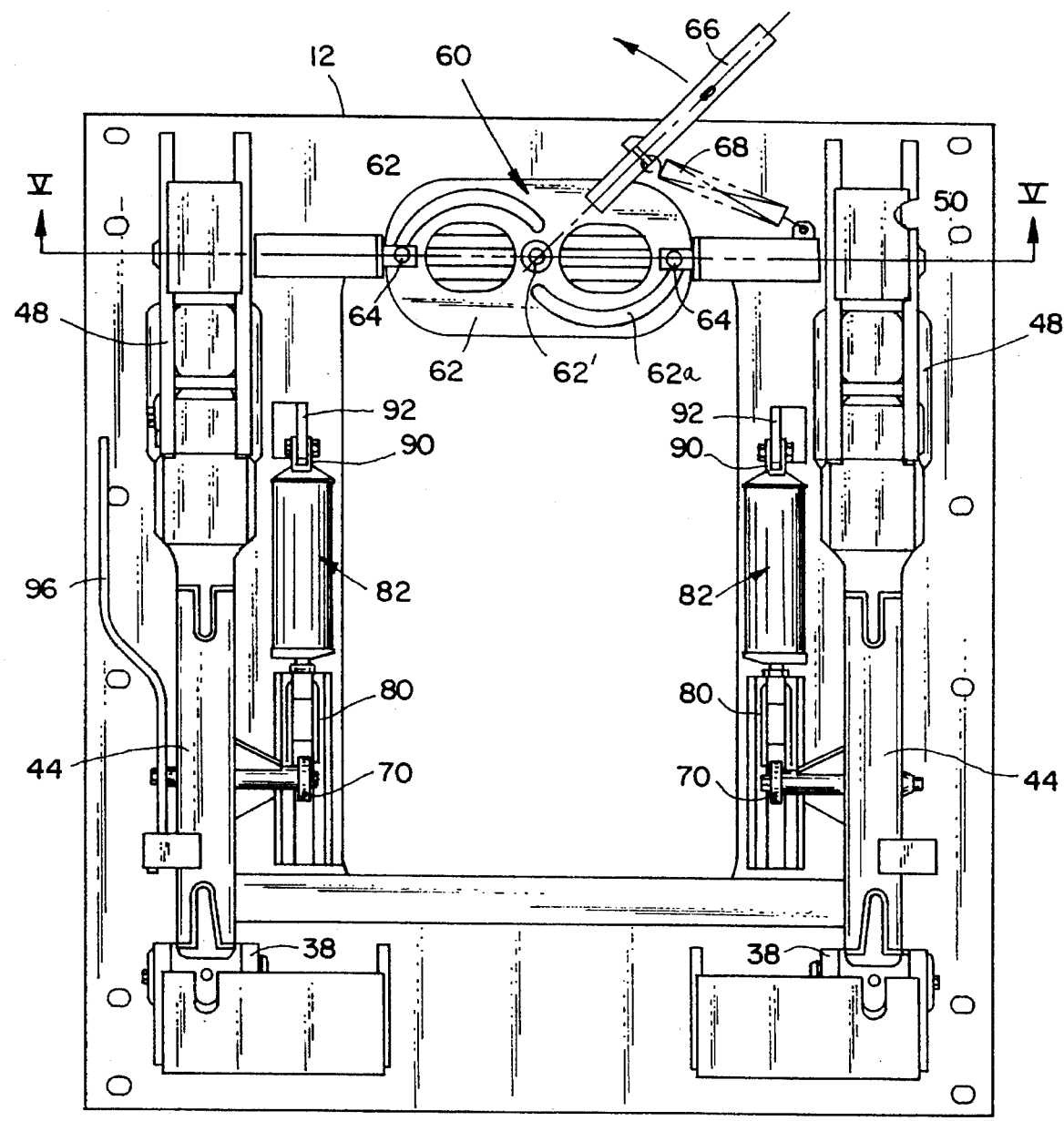
FIG. 4 is a plan view of the hitch assembly in FIGS. 1–3, with the fifth wheel removed and the bottom support shown in phantom.
Figure 5:
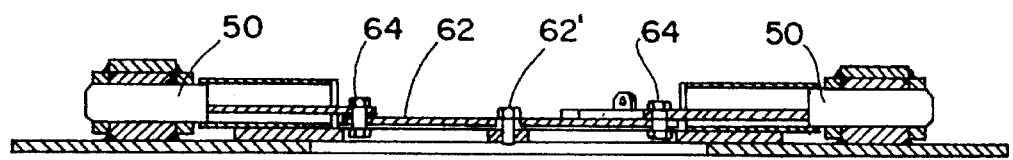
FIG. 5 is a sectional view taken on plane V—V of FIG. 4.
Figure 6:
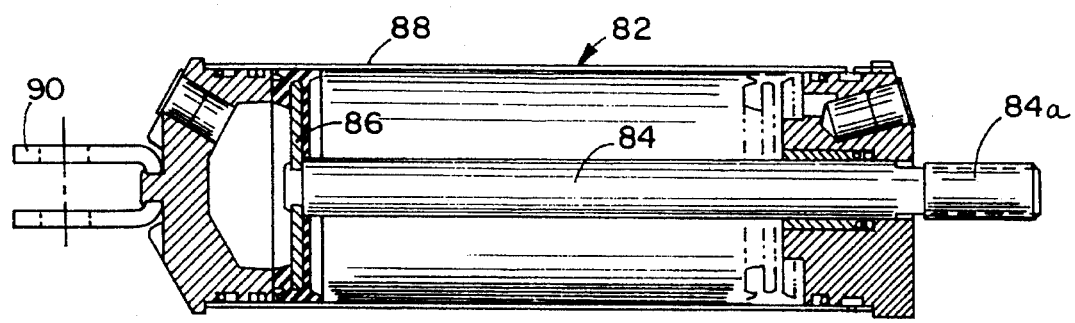
FIG. 6 is a sectional view of one of the fluid actuators for the invention.
Figure 8:
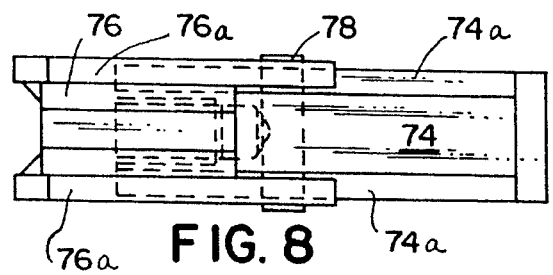
FIG. 8 is a top view of the wedging cams in FIG. 7.
Figure 7:
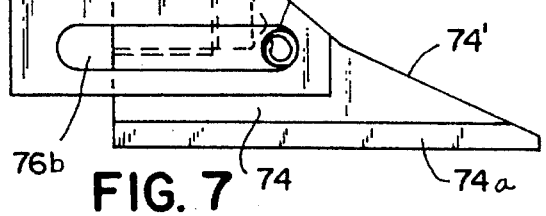
FIG. 7 is a side elevational view of one of the wedging cams, showing the first and second wedges in extended condition.

At the two opposite lateral sides of the support and the fifth wheel is a pair of rear, fixed, support mounts 38 and a pair of forward, fixed mounts 40. Mounts 38 and 40 are fixedly secured to rear and front end portions of support 12 as by welding. The fifth wheel plate is mounted on rear, fixed mounts 38 and forward pivot mounts 40 by linkages. Specifically, a torque frame 44 has one end pivotally mounted to support mounts 38 by pivot pins 42, and has the opposite end pivotally mounted to trunnion pins 26. Preferably a small terminal portion of frame 44 extends forwardly of trunnion pins 26 for attachment of forward links 48 in a manner to be described. Forward links 48 have the forwardmost end thereof pivotally mounted by pivot pins 50 to forward mounts 40. The opposite rearward ends of links 48 are pivotally mounted by pins 52 to the terminal ends of torque frame 44. These forward links and torque frame form linkages. These linkages on opposite sides of the fifth wheel plate support the fifth wheel plate in the lowered condition illustrated in FIG. 2, and the elevated position illustrated in FIG. 3. The hitch can be locked in either the elevated position or the lowered position by lock mechanism 60 at the forward end of support 12. Specifically, transverse plungers or pins 50 can be inserted through links 48 at either of two openings along the length of links 48 and through mounts 40. In FIG. 3 pins 50 are shown in openings 48a at the forward ends of links 48. In FIG. 2, pins 50 are shown in the alternate openings 48b offset toward the opposite end of links 48. Pins 50 thus form interference elements to serve as lock pins in either condition of the hitch. These lock pins are transversely movable relative to the longitudinal centerline of the hitch, i.e., either toward each other to retract from the links, or away from each other to be inserted into the links. This movement of these lock pins is achieved with a cam plate 62 which is pivotally mounted at its center pin 62' to support 12. The cam plate includes a pair of eccentric arcuate cam slots 62a on opposite ends thereof and in which cam follower pins 64 engage. A manual handle 66 extends from cam 62, being biased by a tension spring 68 in one direction wherein the pins 50 are in the inserted locked position. To unlock the mechanism, the handle is moved in the direction indicated by the arrow in FIG. 4, pivoting cam plate 62 about its center pin 62' and thus causing cam followers 64 to follow eccentric cam tracks 62a and thereby retract lock pins 50 from links 48.

Figure 9:
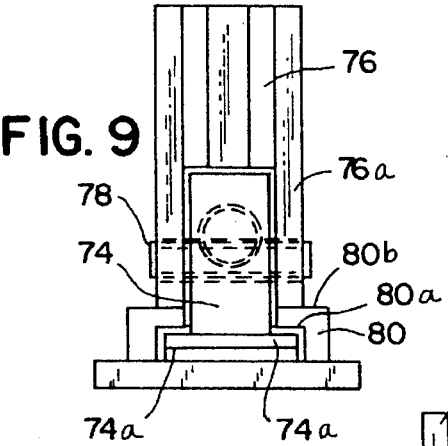
FIG. 9 is an end elevational view of the wedging cams in FIG. 7.
Figure 11:
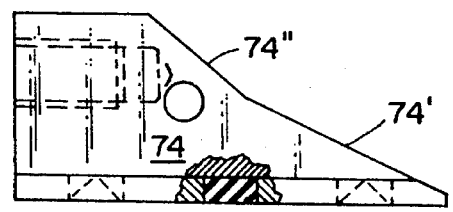
FIG. 11 is a side elevational view of the first, i.e., lower, cam.

Mounted intermediate the ends of torque frame 44 are laterally spaced cam follower rollers 70. These rollers cooperate with wedging cams 72, each comprising a first, lower wedge 74 and a second, upper wedge 76 which have a special relationship with respect to each other. Lower wedge 74 has a pair of oppositely extending bottom flanges 74a which ride in the lower track 80a of a guide track 80 (FIG. 9). The lower wedge 74 is shown to be internestable with upper wedge 76, this upper wedge having a pair of side flanges 76a which straddle lower wedge 74 and ride upon the upper track surface 80b of guide track 80. In flanges 76a are horizontally elongated slots 76b. A roll pin 78 extends transversely through lower wedge 74 and through these slots 76b, enabling the two wedges to controllably move longitudinally relative to each other. Attached to the forward end of each of lower wedges 74 is a fluid actuator, preferably a fluid cylinder 82. More specifically, the threaded end 84a of piston rod 84 extending from piston 86 within fluid actuator cylinder 88 is threadably attached to the front end of lower wedge 74. The opposite end of the cylinder at clevis 90 is pivotally attached to a bracket 92 which is fixedly mounted to support plate 12 (FIG. 3). Fifth wheel plate 16 conventionally has downwardly protruding rib structure therebeneath for strength purposes. This rib structure includes a transverse depending rib 16a (FIG. 3) located toward the rear and extending between and beneath the bifurcation projections 18. The underlying supporting rib structure limits the useable space beneath the fifth wheel plate and above support 12 to a small dimension. Fluid cylinder actuators 82 operate the multipart wedging cam in a manner so as not to interfere with the rib structure on the underside of fifth wheel 16, yet effectively raising the fifth wheel hitch several inches.

Figure 10:
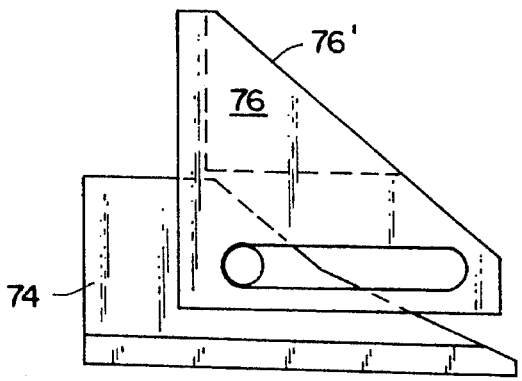
FIG. 10 is a side elevational view of the wedging cams in contracted, nested condition.
Figure 12:
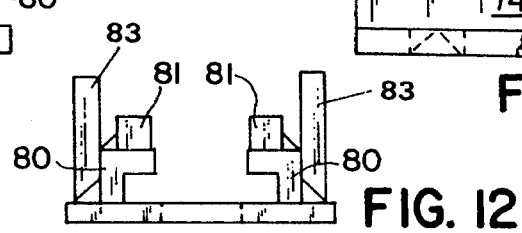
FIG. 12 is an end elevational view of a slide track for the wedging cam.

More specifically, as the fluid actuator extends its piston rod 84 from cylinder 88, lower wedge 74 is moved rearwardly. This lower wedge is shown to have a first, lower inclined surface 74' at a small acute angle and, half way up the incline, has a second upper incline surface 74" at a larger acute angle. This larger acute angle preferably matches the acute angle of the slope of wedging incline 76' of upper wedge 76. In the retracted condition of the wedging cams, the two wedges of each cam are internested with each other in the fashion shown in FIG. 10 and in phantom lines in FIG. 3. Extension of the fluid actuator piston rod 84 causes the lower wedge to advance in its track 80a into engagement with cam follower rollers 70, and then forcibly under rollers 70, thereby giving the initial raising force to the fifth wheel hitch. Only the lower wedge is then moving, and the upper wedge is not advanced. Rather, as the lower wedge advances, its roll pin 78 moves forwardly in slots 76b. At the time the roll pin engages the rear end of slots 76b, roller 70 is at the juncture between the two wedges. Further rearward movement of the fluid actuator thus causes both wedges to move rearwardly, the roller then following the steeper incline of ramp surface 76' of upper wedge 76. At full extension of fluid cylinders 82 (see solid lines in FIG. 3), both wedges are at the maximum extension rearwardly, with cam follower rollers 70 near the top of ramps 76'. A pair of safety stops 83 (FIG. 12) on the guide tracks are provided to prevent accidental excess extension movement of the wedge cams past rollers 70. At this point, the fifth wheel hitch and the links can be secured in this elevated condition by shifting lock handle 66 (FIG. 4) to rotate cam plate 62 and thereby extend locking pins 50 into receiving orifices 48a of links 48 (FIG. 3).

To lower the fifth wheel hitch, lock handle 66 is moved in the opposite direction, swiveling cam plate 62 to retract locking pins 50 from orifices 48a. Fluid cylinders 82 are then shifted to the retracted position, thereby withdrawing the lower wedges 74 and then, when roll pins 78 engage the forward ends of slots 76b, withdrawing upper wedges 76 to the fully nested, contracted condition. As the lower wedge is withdrawn, the weight of the fifth wheel hitch applied to upper wedges 76 by rollers 70 causes the upper wedges to retract simultaneously with the lower wedges. Pairs of stop blocks 81 (FIG. 12) prevent the lower wedge retracting too far so as to strike or move beyond rib 16a. As the fifth wheel hitch lowers, upper wedges 76 optionally engage stop blocks 81 (FIGS. 1 and 12) on the slide tracks, while lower wedges 74 retract further, so that roll pins 78 move to the front ends of slots 76b. The fifth wheel can then be locked in lowered position by again shifting handle 66 to swivel cam plate 62 and thereby extend locking pins 50 outwardly, in opposite directions, into openings 48b of links 48.

A result of this mechanism is that with only a short length fluid actuator, a fifth wheel can be raised and lowered effectively and locked in either position, using the interaction of the wedging cams and the rollers. If additional assistance to the actuators is occasionally needed to raise the fifth wheel hitch, this can be achieved using a manual handle 96 mounted at 96' to one or both sides of the fifth wheel assembly, i.e., specifically to torque frame 44.

Conceivably the preferred embodiment depicted may be altered in some respects to suit particular installations. Therefore, it is not intended that the invention be limited to the specific preferred embodiment set forth as exemplary, but only by the scope of the appended claims and the reasonably equivalent structures to those defined therein.

The embodiments of the invention in which an exclusive property or privilege is claimed are defined as follows.

1. A powered, adjustable height fifth wheel hitch comprising:

a support;

a fifth wheel hitch plate above said support, having opposite lateral sides and having a fore to aft longitudinal axis;

linkage between said support and said fifth wheel hitch plate at each said lateral side, allowing said fifth wheel hitch plate to move vertically up or down with respect to said support;

a pair of cam followers on each said linkage;

a pair of wedging cams on said support, positioned to cooperatively engage said cam followers;

each said wedging cam comprising a pair of slidably interconnected lower and upper wedges;

a pair of power actuators mounted on said support and connected to said wedging cams to extend and sequentially shift said lower wedges and then said upper wedges into elevating engagement with said cam followers, to raise said fifth wheel plate relative to said support, and to retract and sequentially shift said upper wedges and then said lower wedges to lower said fifth wheel plate relative to said support.

2. The powered, adjustable height fifth wheel hitch in claim 1 wherein said lower and upper wedges of each said wedging cam are internested with each other.

3. The powered, adjustable height fifth wheel hitch in claim 2 wherein said internested upper and lower wedges have a pin and slot sliding interconnection with each other.

4. A powered, adjustable height fifth wheel hitch, comprising:

a support plate having a front end portion and a rear end portion;

a fifth wheel plate above said support plate, having a front portion and a bifurcated rear portion;

coaxial transverse trunnion pins supporting said fifth wheel plate on said support plate;

a pair of spaced, fixed, rear mounts on said support plate rear end portion;

a torque frame linkage between said rear mounts and said trunnion pins;

a pair of spaced, forward mounts on said support plate front end portion;

a pair of spaced forward links between said slide mounts and said torque frame linkage;

lock pin receiving openings in said forward links and said forward mounts;

interconnected lock pins shiftable simultaneously between lock position in said openings and unlock position out of said openings;

a pair of laterally spaced cam followers on said torque frame linkage;

a pair of laterally spaced, slidably movable, vertically tapered wedge cams on said support plate, engageable beneath respective ones of said cam followers; and a pair of fluid actuators attached to said support plate and connected to said wedging cams, and actuable to shift said wedging cams toward and away from said cam followers, and thereby shift said cam followers vertically up and down respectively to raise and lower said fifth wheel plate.

5. The powered, adjustable height fifth wheel hitch in claim 4 wherein said wedging cams each have first and second nested wedges movable with respect to each other and positioned one above the other, a slide connection between each of said first and second wedges, said fluid actuators being connected to said first wedges.

6. The powered, adjustable height fifth wheel hitch in claim 5 wherein said slide connection comprises longitudinal slots in said second wedges, and pins in said first wedges, said pins slidably fitting in said slots for allowing limited longitudinal movement between said wedges.

7. The powered, adjustable height fifth wheel hitch in claim 5 including a swivel cam with curved eccentric cam tracks, cam followers in said cam tracks connected to said lock pins, and an actuator on said swivel cam for swiveling said swivel cam to insert or withdraw lock pins into or out of said lock pin receiving openings.

\* \* \* \* \*